United States Patent Office 3,822,257
Patented July 2, 1974

3,822,257
PRODUCTION OF 2,1,3-BENZOTHIADIAZIN-4-ONE-2,2-DIOXIDES
Gerhard Hamprecht, Mannheim, Karl-Heinz Koenig, Frankenthal, and Gerhard Bolz, Ludwigshafen, Germany, assignors to Badische Anilin- & Soda-Fabrik Aktiengesellschaft, Ludwigshafen (Rhine), Germany
No Drawing. Filed Feb. 3, 1972, Ser. No. 223,341
Int. Cl. C07d 93/30
U.S. Cl. 260—243 R         9 Claims

ABSTRACT OF THE DISCLOSURE

Production of 2,1,3-benzothiadiazin-4-one-2,2-dioxides by cyclization of an o-sulfamidobenzoic acid in the presence of phosgene and a disubstituted carboxamide or a tertiary amine at a temperature of not more than 50° C. The products are plant protection agents and starting materials for the production of dyes and plant protection agents.

---

The invention relates to a process for the production of 2,1,3-benzothiadiazin-4-one-2,2-dioxides by cyclization of an o-sulfamidobenzoic acid in the presence of phosgene and a disubstituted carboxamide or a tertiary amine at a temperature of not more than 50° C.

It is known from Belgian Pat. 702,877 and supported by an example that o-sulfamidobenzoic esters can be cyclized to 2,1,3 - benzothiadiazin - 4 - one-2,2-dioxides. Phosphorus oxychloride, thionyl chloride and alkali solutions are specified as cyclizing agents. Only the alkaline cyclizing agent is described in the abovementioned example. The refluxing temperature of the alkaline methanol solution is given as the cyclization temperature. The only starting material mentioned by example, N-propyl-o-sulfamidobenzoic acid methyl ester, can only be prepared in a troublesome multistage sequence of reactions, for example condensation of anthranilic acid with methanol by a known method, distilling the mixture and reaction with an N-acylated sulfamyl chloride.

Cyclization of o-sulfamidobenzoic acids under the influence of chlorinating or water-eliminating condensing agents is described in German Pat. 1,120,456 (column 3, lines 43 to 57). In the case of o-sulfamidobenzoic acids with free carboxyl groups only phosphorus oxychloride is mentioned as condensing agent and a reaction temperature of at least 70° C. is described and illustrated by Example 2. It is emphasized that the reaction conditions depend on whether the free carboxyl group or an ester or carboxylic halide group is situated in the o-position to the sulfamido group. It is only when anthranilic esters are used as starting materials that there is any reference to the fact that ring closure is accelerated by the addition of bases. Only caustic soda solution is illustrated in the examples as a base. If the acid ring closure method is used in the case of N-alkyl-o-sulfamidobenzoic or N-cycloalkyl-o-sulfamidobenzoic acids, byproducts are obtained in larger amounts and an unsatisfactory yield of end product results. In addition to cyclization, hydrolysis of the end product takes place and this is intensified by the high reaction temperature. Both in the case of phosphorus oxychloride and also in the case of for example thionyl chloride considerable amounts of anthranilic acid are formed at temperatures of 70° to 90° C. by cleavage of the sulfamido bond.

An article in J. Amer. Chem. Soc., volume 84, pages 1944 et seq. describes the reaction of methyl anthranilate and sulfamyl chloride in the presence of an organic solvent and of caustic soda solution to form 2,1,3-benzothiadiazin-4-one-2,2-dioxide. The end product is isolated by extraction with caustic soda solution. Reference is made to the instability of N-sulfamylanthranilic acid. The cyclization of this starting material under the said conditions gives a reaction mixture of different components and an end product in an unsatisfactory yield and purity.

The object of the invention is to provide a new process for preparing 2,1,3-benzothiadiazin-4-one-2,2-dioxide in good yields and purity by a simpler and more economical method.

We have found that 2,1,3-benzothiadiazin-4-one-2,2-dioxides of the general formula (I):

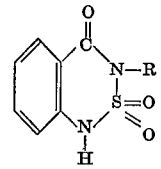

where R is an aliphatic or cycloaliphatic radical are obtained advantageously by cyclization of o-sulfamidobenzoic acids in the presence of a cyclizing agent by cyclizing an o-sulfamidobenzoic acid of the general formula (II):

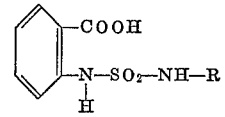

where R has the meanings given above in the presence of phosgene and a carboxamide substituted twice on the nitrogen atom or a tertiary amine at a temperature of not more than 50° C.

The process may be carried out advantageously by reacting anthranilic acid or one of its salts by a known method with a sulfamido acid halide of the general formula (III):

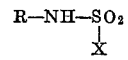

in which R has the meanings given above and X is halogen to form the starting material (II) and cyclizing the starting material (II) in the reaction mixture thus obtained into the end product (I).

When N-isopropyl-N'-(o-carboxy)-phenylsulfamide is used, the reaction may be represented by the following equation:

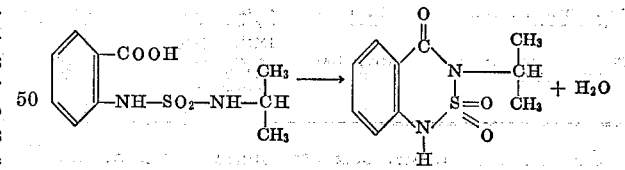

The invention is based on the observation that the cyclization of o-sulfamidobenzoic acids to end products (I) achieves an optimum not by optimum choice of a single parameter, for example the temperature or the cyclizing agent, but only by a combination of a variety of special conditions. Cyclization with phosgene alone (without the addition of a base) gives much poorer results at higher temperature (for example 65° C.) and cyclization does not take place to an appreciable extent at a low temperature (for example 25° C.).

As compared with the prior art methods, the process of the invention gives 2,1,3-benzothiadiazin-4-one-2,2-dioxides in good yields and high purity by a simpler and more economical method. As compared with the method described in the said Belgian Patent the use of the starting materials of the invention and the lower reaction temperature represent an economical advantage in industrial operation. The starting material is more readily accessible than an ester and moreover the alcohol of the ester eliminated in the reaction can only be recovered by troublesome and expensive methods. As compared with the other methods the process of the invention offers a purer end product in a higher yield. Hydrolysis of the end product and the formation of byproducts do not take place to an appreciable extent. Extraction with caustic alkali solution is not necessary in the isolation of the end product. These advantageous results are surprising having regard to the prior art.

The starting material (II) is cyclized in the presence of phosgene, preferably in a ratio of 1 to 1.5 moles of phosgene per mole of starting material (II). Preferred starting materials (II) and consequently preferred end products (I) are those in whose formulae R is linear or branched alkyl of one to six carbon atoms or cycloalkyl of five to eight carbon atoms. The said radicals may bear, as substitutents, groups and/or atoms which are inert under the reaction conditions, for example alkyl or alkoxy of one to four carbon atoms.

The following o-sulfamidobenzoic acids are examples of suitable starting materials (II):

N-methyl-N'-o-carboxyphenylsulfamide,
N-ethyl-N'-o-carboxyphenylsulfamide,
N-n-propyl-N'-o-carboxyphenylsulfamide,
N-n-butyl-N'-o-carboxyphenylsulfamide,
N-isobutyl-N'-o-carboxyphenylsulfamide,
N-isopropyl-N'-o-carboxyphenylsulfamide,
N-tert.-butyl-N'-o-carboxyphenylsulfamide,
N-cyclohexyl-N'-o-carboxyphenylsulfamide,
N-cyclopentyl-N'-o-carboxyphenylsulfamide and
N-cyclooctyl-N'-o-carboxyphenysulfamide.

Cyclization is carried out at a temperature of not more than 50° C., preferably of from −20° to +25° C., particularly at from −6° to +10° C., at atmospheric or superatmospheric pressure, continuously or batchwise. The catalyst used is a carboxamide bearing two substituents on the nitrogen atom or a tertiary amine, advantageously in an amount of from 5 to 25% by weight, based on phosgene. Mixtures of the said catalysts are also suitable for the cyclization. Preferred catalysts are trimethylamine, triethylamine, pyridine, N-dimethylaniline, N-diethylaniline, N-ethylpiperidine, N-methylpyrrolidone, α-picoline, β-picoline, γ - picoline, N-propylpiperidine, quinoline, isoquinoline, quinazoline, quinoxaline, triamylamine, tri-n-butylamine, n-propyldiisopropylamine, trifurfurylamine, trihexylamine, N-methylimidazole, N-methylpyrrole, N-dimethylcyclohexylamine; pyrimidine, acridine; dimethylformamide, diethylformamide, formic-N - methylanilide, N,N-dimethylacetamide and N-methylpyrrolidone.

The cyclization is conveniently carried out in the presence of a solvent. Solvents having dipole moments of more than 1.2 are preferred. Houben-Weyl, "Methoden der organischen Chemie," volume 3/2 pages 361 et seq., may be referred to for a definition and determination of the dipole moment. Examples of suitable solvents are halohydrocarbons such as methylene chloride, 1,1 - dichloroethane, 1,2 - dichloroethane, 1,2-cis-dichloroethylene, n-butyl chloride, 2-butyl chloride, 3-butyl chloride, isobutyl chloride, chlorobenzene, bromobenzene, iodobenzene, o-dichlorobenzene, m-dichlorobenzene, o-dibromobenzene, m-dibromobenzene, o-chlorotoluene, m-chlorotoluene, p-chlorotoluene, 1,2,4-trichlorobenezene, chloro-1,3,5-trimethylbenzene, 1,10 - dibromodecane, 1,4 - dibromobutane; N,N-disubstituted carboxamides such as di-methylformamide; ketones such as acetone, acetophenone, cyclopentanone or cyclohexanone; esters such as methyl acetate, isobutyl acetate, methyl benzoate, phenyl acetate; nitrohydrocarbons such as nitromethane, nitroethane, nitrobenzene, o-chloronitrobenzene, m-chloronitrobenzene, p-chloronitrobenzene, o-nitrotoluene; nitriles such as acetonitrile, benzonitrile, m-chlorobenzonitrile; tertiary amines such as pridine, n-dimethylcyclohexylamine, N-dimethylaniline, α-picoline, β-picoline, γ-picoline; quinoline, isoquinoline, pyrimidine and appropriate mixtures.

Similarly mixtures of polar solvents, for example ketones, with aromatic or aliphatic hydrocarbons, for example acetone and toluene or ligroin or chlorobenzene and acetone may be used. Polar solvents having a dipole moment of more than 1, for example chloroform, are also suitable. The polar solvent is advantageously present in an amount of from 250 to 400% by weight based on starting material (II). It is often advantageous to use the catalyst at the same time as a solvent for the formation of the reaction medium, the amount of catalyst being appropriately increased for the purpose.

The reaction may be carried out as follows: a mixture of starting material (II), phosgene, catalyst and optionally solvent is kept for from eight to sixteen hours at the reaction temperature. The solvent and excess phosgene are then removed and the end product is isolated from the residue by a conventional method, for example by taking it up in one of the said solvents and effecting precipitation by adding water followed by filtration. The reaction mixture (with or without separation of excess phosgene and/or some of the solvent) may also be extracted with caustic soda solution, the separated alkaline phase acidified and the end product filtered off.

In an advantageous embodiment of the process, substances which form the starting material (II) are used instead of the starting material (II) itself. The starting material (II) may be prepared by any method and the cyclization carried out in the reaction mixture without isolation of the starting material (II) formed, and if desired another component of the mixture, for example the solvent, may be previously separated or decreased in amount. It is preferred to use the process described in U.S. Patent Application Ser. No. 221,021, filed Jan. 26, 1972, for the production of the starting material (II). Anthranilic acid or one of its salts is first reacted with a sulfamyl halide, particularly the chloride, having the general formula (III):

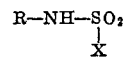

in which R has the meaning given above and X is halogen, in the presence of a polar organic solvent at a temperature of from 15° to 40° C. Preferred substances (III) are those in whose formula R has the said preferred meaning and X is bromine or particularly chlorine. The reaction is conveniently carried out at from 15° to 25° C. and in the presence of the abovementioned polar organic solvents with a dipole moment of more than 1.2 or the said solvent mixtures and in the presence of a disubstituted carboxamide or a tertiary amine, particularly one of the abovementioned bases. Reference may be made to the said Patent for details of preferred reaction conditions and concentration of the reactants. After this first reaction is over, phosgene with or without catalyst is added and cyclization is carried out as described above.

Compounds prepared according to the process of the invention are plant protection agents and valuable starting materials for the production of dyes and plant protection agents. Reference may be made to the said publication as to use. The equivalent salts, particularly the alkali metal salts, may be prepared from end products (I) by known methods, for example by reaction with bases according to the method described in German Pat. 1,120,-456. These salts are plant protection agents and pharmaceuticals and valuable starting materials for the production of such products.

The following Examples illustrate the invention. The parts specified are parts by weight.

EXAMPLE 1

(a) 25 parts of phosgene is introduced while stirring at −15° C. into a suspension of 51.7 parts of N-isopropyl-N'-(o-carboxy)-phenylsulfamide in 190 parts of chloroform and 5.2 parts of dimethylformamide. The mixture is stirred for fourteen hours at 5° to 8° C. After excess phosgene and the chloroform have been separated, the oily residue is taken up in 10 parts of acetone and crystallized out by adding 250 parts of water. 41.8 parts (87% of theory) of 3 - isopropyl-2,1,3-benzothiadiazin-4-one-2,2-dioxide is obtained of the melting point 125° to 129° C.

(b) A yield of 91% of theory of end product (I) of the melting point 125° to 126° C. is obtained analogously by using a solvent mixture of 87 parts of toluene and 33 parts of acetone and 2.62 parts of dimethylformamide.

EXAMPLE 2

14.5 parts of phosgene is introduced while stirring at —20° C. into a suspension of 25.8 parts of N-isopropyl-N'-(o-carboxy)-phenylsulfamide in 43 parts of toluene, 16 parts of acetone and 6.1 parts of N-dimethylaniline. The mixture is stirred for fourteen hours at room temperature. The solution is then concentrated, taken up in 100 parts of caustic soda solution (10% by weight) and filtered. The alkaline phase is acidified and the precipitate is suction filtered. 20 parts (83% of theory) of 3-isopropyl-2,1,3-benzothiadiazin - 4 - one-2,2-dioxide is obtained having a melting point of 129° to 131° C.

EXAMPLE 3

(a) 4.68 parts of N-isopropylsulfamyl chloride and 3.78 parts of dimethylcyclohexylamine are slowly introduced through two supply pipes over one hour at 15° C. while stirring vigorously into a suspension of 3.62 parts of anthranilic acid in 18.2 parts of chlorobenzene and 2.54 parts of acetone. The mixture is stirred for one hour at 20° C. After 0.230 part of dimethylformamide has been added, 3.9 parts of phosgene is added over six hours at —6° C. The mixture is stirred for nine hours at —6° C. and four hours at 20° C. The excess phosgene and the acetone are then removed at 30° C. and a pressure of 80 mm. The solution is then extracted with a mixture of 3.8 parts of sodium hydroxide and 54 parts of water. After the alkaline phase has been separated, stirred into 26 parts of hydrochloric acid (13% by weight), filtered and the filtered material dried, 4.94 parts (78% of theory) of 3-isopropyl-2,1,3-benzothiadiazin-4-one-2,2-dioxide is obtained with a melting point of 124° to 130° C.

(b) The extraction of the organic phase with caustic soda solution in Example 3(a) can be omitted without disadvantage. If phosgene and solvent are removed and the residue which remains is stirred into 80 parts of water, the dimethylcyclohexyl amine hydrochloride formed passes into solution while at the same time 3-isopropyl-2,1,3-benzothiadiazin-4-one-2,2-dioxide is precipitated in about 97% purity. 4.83 parts (76% of theory) of end product (I) is obtained.

(c) The reaction is carried out at 15° to 20° C. analogously to Example 3(a). The same yield of end product is obtained.

EXAMPLES 4 TO 7

As described in Example 3(a) and under the same conditions in the production of the starting material (II), the reaction temperature, the working up and with the same amount of catalyst and polar solvent, the cyclization after the two-stage process is carried out with the following starting materials (III) indicated in the Table:

A=N-methylsulfamyl chloride
B=N-ethylsulfamyl chloride
C=N-n-propylsulfamyl chloride
D=N-isobutylsulfamyl chloride The end products obtained are as follows:

A'=3-methyl-2,1,3-benzothiadiazin-4-one-2,2-dioxide
B'=3-ethyl-2,1,3-benzothiadiazin-4-one-2,2-dioxide
C'=3-n-propyl-2,1,3-benzothiadiazin-4-one-2,2-dioxide
D'=3-isopropyl-2,1,3-benzothiadiazin-4-one-2,2-dioxide The following abbreviations are used in the Table:

Ex.=Example;
(III)=starting material (III);
Percent Th=percent of theory;
(I)=end product (I);
M. pt. ° C.=melting point in ° C.

TABLE

| Ex. | Parts | (III) | Parts | Percent Th | (I) | M. pt., ° C. |
|---|---|---|---|---|---|---|
| 4 | 45.3 | A | 46.7 | 73.3 | A' | 207 |
| 5 | 48.8 | B | 51.0 | 75.1 | B' | 181 |
| 6 | 53.6 | C | 49.1 | 68.0 | C' | 191–192 |
| 7 | 58.2 | D | 60.6 | 79.4 | D' | 153–154 |

We claim:
1. A process for the production of a 2,1,3-benzothiadiazin-4-one-2,2-dioxide of the formula (I):

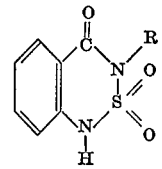

where R is alkyl of one to six carbon atoms, cycloalkyl of five to eight carbon atoms or the same radicals bearing alkyl or alkoxy of one to four carbon atoms, which process comprises cyclizing an o-sulfamidobezoic acid of the formula (II):

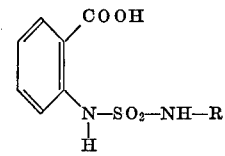

where R has the meaning given above, at a temperature of not more than 50° C. in the presence of phosgene and a catalyst selected from the class consisting of trimethylamine, triethylamine, pyridine, N-dimethylaniline, N-diethylaniline, N-ethylpiperidine, N-methylpyrrolidone, α-picoline, β-picoline, γ-picoline, N-propylpiperidine, quinoline, isoquinoline, quinazoline, quinoxaline, triamylamine, tri-n-butylamine, n - propyldiisopropylamine, trifurfurylamine, trihexylamine, N-methylimidazole, N-methlypyrrole, N-dimethylcyclohexylamine, pyrimidine, acridine, dimethylformamide, diethylformamide, formic-N-methylanilide, N,N-dimethylacetamide and N-methylpyrrolidone.

2. A process as claimed in claim 1 wherein anthranilic acid or one of its salts is reacted with a sulfamyl halide of the formula (III):

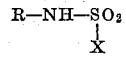

where
R has the meaning given above and
X is halogen to form the starting material (II) which is then cyclized to the end product (I) in the reaction mixture without separation of the starting material (II).

3. A process as claimed in claim 1, wherein the cyclization is carried out with a ratio of 1 to 1.5 moles of phosgene per mole of starting material (II).

4. A process as claimed in claim 1 wherein the cyclization is carried out at a temperature of from —6° to +25° C.

5. A process as claimed in claim 1 carried out at a temperature of from —6° to +10° C.

6. A process as claimed in claim 1 wherein the cyclization is carried out with an amount of said catalyst of from 5 to 25% by weight based on phosgene.

7. A process as claimed in claim 1 wherein the cyclization is carried out in the presence of a solvent having a dipole moment of more than 1.

8. A process as claimed in claim 1 wherein the cyclization is carried out with a solvent having a dipole moment of more than 1.2 in an amount of 250 to 400% by weight based on starting material (II).

9. A process as claimed in claim 1 wherein anthranilic acid or one of its salts is reacted with a sulfamyl halide of the formula

  (III)

where R has the meaning given above and X is halogen in the presence of a polar organic solvent at a temperature of from 15° to 40° C. to form starting material (II) which is then cyclized to end product (I) in the resultant reaction mixture without separation of the starting material (II).

References Cited

UNITED STATES PATENTS

| | | | |
|---|---|---|---|
| 3,050,553 | 8/1962 | Novello | 260—243 X |
| 3,621,017 | 11/1971 | Zeidler et al. | 260—243 |

JOHN M. FORD, Primary Examiner

U.S. Cl. X.R.

424—246

UNITED STATES PATENT AND TRADEMARK OFFICE
CERTIFICATE OF CORRECTION

PATENT NO. : 3,822,257
DATED : July 2, 1974
INVENTOR(S) : Gerhard Hamprecht et al.

It is certified that error appears in the above-identified patent and that said Letters Patent are hereby corrected as shown below:

In the Heading, after Line 8, insert -- Claims priority, application Germany, February 8, 1971, P 21 05 687.1--

In Column 3, Line 73, delete "pridine" and substitute --pyridine--

In Column 6, Line 29, delete "0-sulfamidobezoic" and substitute --0-sulfamidobenzoic--

In Column 6, Line 46 & 47, delete "n-methlypyrrole" and substitute --n-methylpyrrole--

Signed and Sealed this

Twentieth Day of July 1976

[SEAL]

Attest:

RUTH C. MASON
Attesting Officer

C. MARSHALL DANN
Commissioner of Patents and Trademarks